United States Patent
Tamura

(10) Patent No.: US 10,768,707 B2
(45) Date of Patent: Sep. 8, 2020

(54) ELECTRONIC APPARATUS HAVING A TOUCH PAD CAPABLE OF PROVIDING VIBRATIONS

(71) Applicant: LENOVO (SINGAPORE) PTE. LTD., Singapore (SG)

(72) Inventor: Fumio Tamura, Kanagawa (JP)

(73) Assignee: LENOVO (SINGAPORE) PTE LTD, Singapore (SG)

( * ) Notice: Subject to any disclaimer, the term of this patent is extended or adjusted under 35 U.S.C. 154(b) by 0 days.

(21) Appl. No.: 16/437,884

(22) Filed: Jun. 11, 2019

(65) Prior Publication Data
US 2019/0377413 A1    Dec. 12, 2019

(30) Foreign Application Priority Data

Jun. 11, 2018    (JP) .................................. 2018-111033

(51) Int. Cl.
| | | |
|---|---|---|
| G06F 3/01 | (2006.01) | |
| G06F 3/0481 | (2013.01) | |
| G06F 1/16 | (2006.01) | |
| G06F 3/041 | (2006.01) | |

(52) U.S. Cl.
CPC ............ G06F 3/016 (2013.01); G06F 1/1637 (2013.01); G06F 3/0412 (2013.01); G06F 3/04812 (2013.01)

(58) Field of Classification Search
CPC .... G06F 3/016; G06F 3/0412; G06F 3/04812; G06F 1/1637
See application file for complete search history.

(56) References Cited

U.S. PATENT DOCUMENTS

2001/0022108 A1*  9/2001  Suzuki .................. G06F 3/0338
                                                          73/862.391
2016/0259414 A1*  9/2016  Fujii ....................... G06F 3/016

FOREIGN PATENT DOCUMENTS

| JP | 2014-164429 A | 9/2014 |
| JP | 2014-164430 A | 9/2014 |
| JP | 2015-184886 A | 10/2015 |
| JP | 2016-083840 A | 4/2016 |
| JP | 2019-028729 A | 2/2019 |
| WO | 2016-139823 A1 | 9/2016 |

* cited by examiner

*Primary Examiner* — Wing H Chow
(74) *Attorney, Agent, or Firm* — Antony P. Ng; Russell Ng PLLC

(57) ABSTRACT

A slim electronic apparatus that can give a user a sufficient sense of clicking in response to a user's touch input operation is disclosed. The electronic apparatus includes a touch-operation unit for receiving a user's touch-input operation; a main body chassis having a support plate with a mounting face to movably mount the touch-operation unit; a vibrator for generating vibrations to the touch-operation unit; and a connector having a fixing part fixed to one of the touch-operation unit and the support plate, and a retained part retained to be movable relative to the other of the touch-operation unit and the support plate at least along one direction parallel to the mounting face.

17 Claims, 12 Drawing Sheets

ELECTRONIC APPARATUS HAVING A TOUCH PAD CAPABLE OF PROVIDING VIBRATIONS

PRIORITY CLAIM

The present application claims benefit of priority under 35 U.S.C. §§ 120, 365 to the previously filed Japanese Patent Application No. JP2018-111033 with a priority date of Jun. 11, 2018, which is incorporated by reference herein.

TECHNICAL FIELD

The present invention relates to electronic apparatuses in general, and in particular to an electronic apparatus having a touch-operation device.

BACKGROUND

There is a demand for slim electronic apparatuses, such as a laptop PC and a tablet PC. An electronic apparatus of this type has been requested to have input units, such as a touchpad and a push button, that can click without a mechanical movement to move up and down. Some of the electronic apparatuses of this type are equipped with a feedback technique (e.g., HAPTIC techniques) that vibrates a vibrator in response to the touch input operation by a user and gives a sense of clicking by haptic sense to the user without a mechanical up-down movement. Examples of the vibrator include an actuator having shape memory alloy (SIA), an actuator having a piezoelectric element (e.g., piezo vibration actuator), an eccentric motor (e.g., eccentric rotating sass), and a linear vibrator (e.g., linear resonant actuator).

Typically, the electronic apparatus as stated above is configured so that the chassis supports a touch-operation unit including a vibrator while floating the touch-control unit with a rubber, and such a touch-control unit generates vibrations. The rubber has one face fixed to the bottom face of the touch-operation unit and the other face fixed to the top face of the chassis.

Such a floating structure with a rubber needs the rubber of about 1 mm in thickness in order to provide enough vibrations to a user, and this is a barrier for a slimmer apparatus. If the rubber is too thin, it would be difficult to generate vibrations that a user can sense.

Consequently, it would be desirable to provide a slim electronic apparatus that can gives a user a sufficient sense of clicking in response to the user's touch operation for input.

SUMMARY

In accordance with an embodiment of the present disclosure, an electronic apparatus includes a touch-operation unit configured to receive a user's touch-input operation; a chassis having at least a support with a mounting face to movably mount the touch-operation unit; a vibrator configured to generate vibrations to the touch-operation unit; and at least one connector having a fixing part fixed to one of the touch-operation unit and the support, and a retained part retained to be movable relative to another of the touch-operation unit and the support at least along one direction parallel to the mounting face.

This electronic apparatus has a floating structure such that the support of the chassis supports the touch-operation unit with connectors. This eliminates the necessity of having a gap corresponding to the thickness of a rubber for floating support between the touch-operation unit and the vibrator as in the conventional techniques, and so the touch-operation unit and the chassis including the touch-operation unit are slim. Such a floating structure with connectors does not attenuate vibrations generated by the vibrator as in the floating structure with a rubber. The floating structure has a fact or to attenuate vibrations by the vibrator that is frictional resistance only between the bottom face of the touch-operation unit and the mounting face of the support, and so transmits vibrations to the touch-operation unit with very little attenuation. As a result, a user has a sufficient sense of clicking due to strong vibrations in response to the user's touch operation.

All features and advantages of the present disclosure will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION

Figure 1:
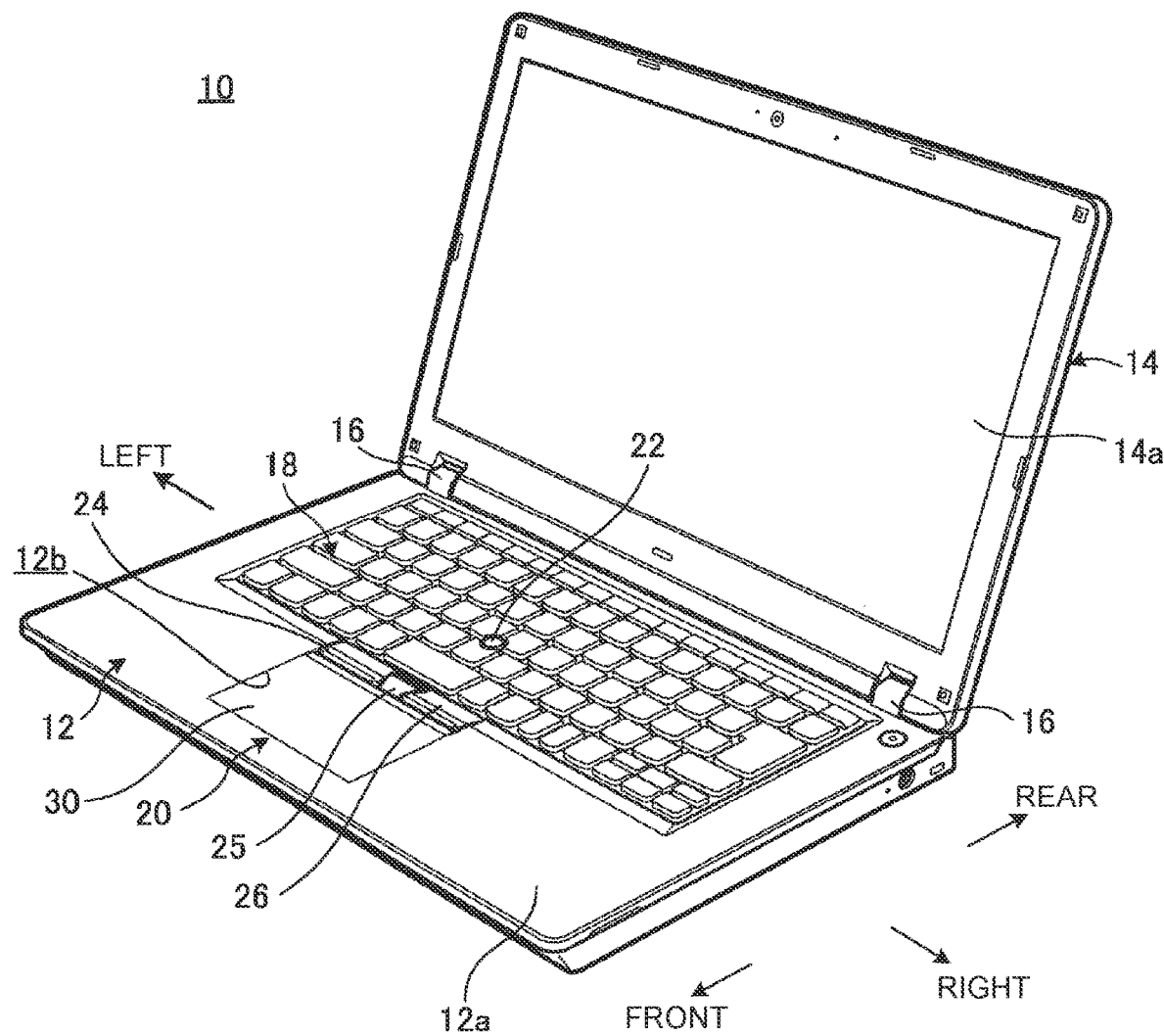
FIG. 1 is a perspective view of an electronic apparatus, according to one embodiment.

FIG. 1 is a perspective view of an electronic apparatus 10 according to one embodiment. The electronic apparatus 10 is a laptop PC including a main body chassis 12 and a display chassis 14 that are rotatably connected via a hinge 16. The present embodiment illustrates the example of the electronic apparatus 10 as a laptop PC, and the electronic apparatus 10 may be other apparatuses, such as a tablet PC and a smart phone.

The main body chassis 12 is a box-like chassis made of resin or metal, and internally stores various electronic components, such as a board, an arithmetic unit, a hard disk device and a memory, which are not illustrated. The main body chassis 12 includes a keyboard unit 18 and a touch-operation device 20 on the top face 12a. The keyboard unit 18 has a pointing stick 22 at a substantially center part. The main body chassis 12 includes three push buttons 24, 25 and 26 between the keyboard unit 18 and the touch-operation device 20.

The touch-operation device 20 and the pointing stick 22 control a cursor (mouse pointer) displayed on the display unit 14a, and is an alternative input-operation unit of a mouse. The touch-operation device 20 is configured as a click pad to implement a tracing operation to trace with a fingertip, for example, and a clicking operation (pushing operation) to click with a fingertip, for example. The push buttons 24 to 26 link with the touch-operation device 20 or the pointing stick 22 to control the cursor. The push buttons 24 to 26 are click-operation buttons corresponding to a left button, a center button and a right button, respectively, of a typical mouse.

The display chassis 14 is a box-like chassis made of resin or metal, and has a display 14a, such as a liquid crystal display, on the front face. The display chassis 14 is electrically connected to the main body chassis 12 via a cable (not illustrated) passing through the hinge 16.

In the following description, referring to the operating mode of the touch-operation device 20 mounted on the electronic apparatus 10 shown in FIG. 1, the direction toward the user using the electronic apparatus 10 is front, the direction away from the user is rear, the thickness direction of the electronic apparatus 10 is up and down, and the width direction of the electronic apparatus 10 is left and right.

Figure 2:
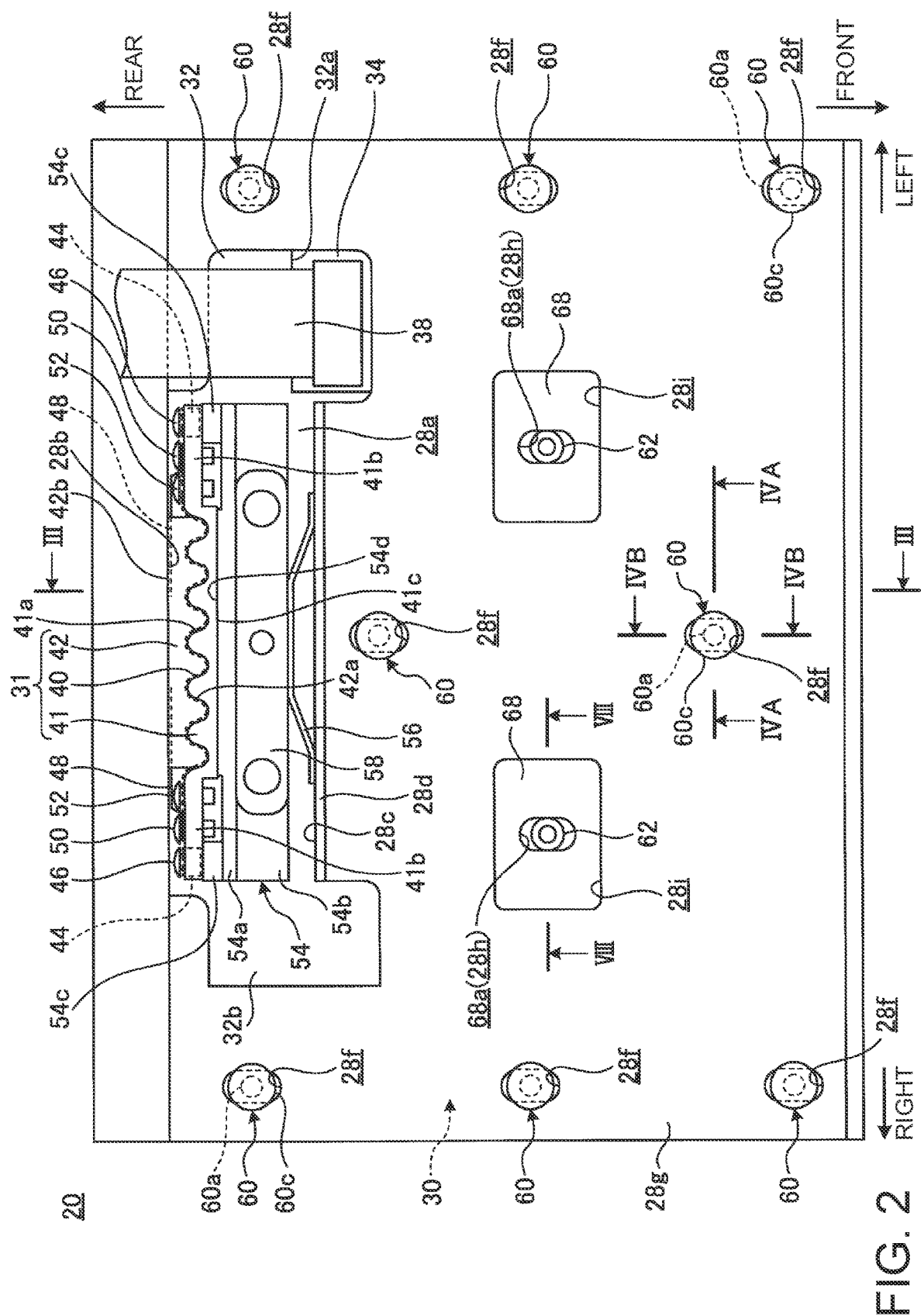
FIG. 2 is a bottom view of a touch-operation device.
Figure 3:
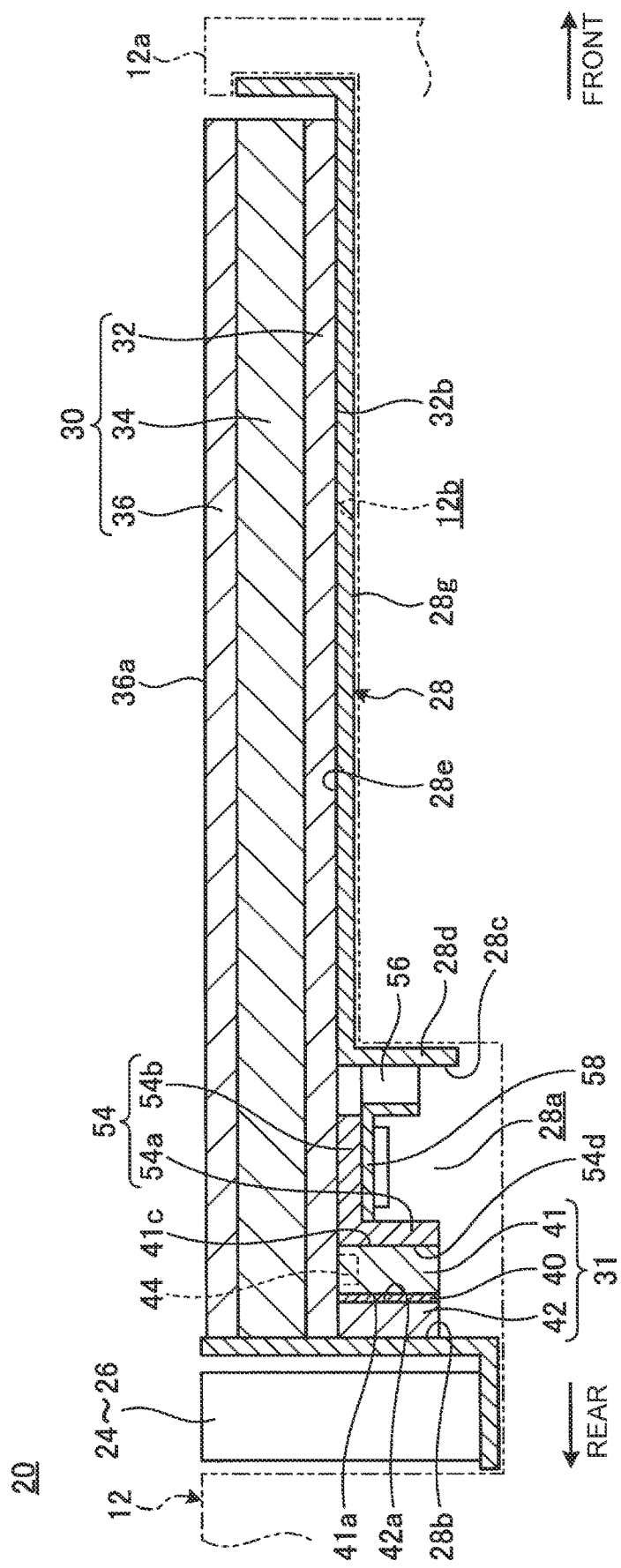
FIG. 3 is a cross-sectional view taken along the line III-III in FIG. 2.

FIG. 2 is a bottom view of the touch-operation device 20. FIG. 3 is a cross-sectional view taken along the line III-III in FIG. 2. FIG. 2 and FIG. 3 show the touch-operation device 20 as well as a support plate 28 functioning as a mounting plate to mount this touch-operation device 20 to the main body chassis 12.

As shown in FIG. 2 and FIG. 3, the touch-operation device 20 includes a touch-operation unit 30 and a vibrator 31. The touch-operation device 20 is movably supported on the top face of the support plate 28 that is fixed to the main body chassis 12. The touch-operation device 20 attached to the support plate 28 is stored in a storage recess 12b at the top face 12a of the main body chassis 12 so that the touch-operation unit 30 is exposed on the top face 12a (see FIG. 1 as well).

The touch-operation unit 30 has a three-layered structure including a base plate 32, a board 34, and a pad plate 36 that are stacked in this order from the bottom to the top, for example.

The base plate 32 is a plate as a bottom plate of the touch-operation device 20. The base plate 32 includes a thin plate made of metal, such as aluminum or stainless steel, and has openings and tabs at appropriate parts.

The board 34 is stacked on the top face of the base plate 32, and is a sensor to detect a touch-input operation, such as a tracing operation or a clicking operation to the input face 36a of the pad plate 36. The board 34 is fixed to the top face of the base plate 32 with adhesive, double-faced tape or the like. The board 34 connects to a board in the main body chassis 12 via a cable 38 passing through an opening 32a of the base plate 32 and an opening 28a of the support plate 28.

The pad plate 36 is stacked on the top face of the base 34, and has a top face that is the input face 36a to receive a users touch-input operation. The pad plate 36 includes a glass plate or a resin plate. The pad plate 36 is fixed to the top face of the board 34 with adhesive, double-faced tape or the like.

The vibrator 31 generates vibrations in response to a user's touch-input operation to the touch-operation unit 30 to vibrate the touch-operation unit 30, and so gives the user a sense of clicking. The vibrator 31 of the present embodiment generates vibrations in response to a clicking operation to the touch-operation unit 30, and does not generate vibrations in response to a tracing operation. The vibrator may generate vibrations in response to a tracing operation. The vibrator 31 of the present embodiment includes an actuator (SIA) including a shape-memory alloy 40.

As shown in FIG. 2 and FIG. 3, the vibrator 31 includes the shape-memory alloy 40, a base part 41 and a driving part 42. The vibrator 31 is fixed to the bottom face 32b of the base plate 32 of the touch-operation unit 30 via a fixing bracket 44, and is movably disposed in the opening 28a of the support plate 28. The vibrator 31 is configured so that contraction of the shape-memory alloy 40 quickly moves the touch-operation unit 30 to generate acceleration of about 6 G, and so gives the user a secure sense of clicking.

The base part 41 is a plate having a corrugated face 41a that extends in the left-right direction and defines a corrugated-curved face, and flange-like supporting pieces 41b and 41b that protrudes to the left and right from the left and right ends of the corrugated face 41a. The end of each supporting piece 41b is fastened to the fixing bracket 44 with a screw 46.

The driving part 42 is a corrugated plate having a corrugated face 42a that extends in the left-right direction and defines a corrugated-curved face. The corrugated face 42a of the driving part 42 is shaped so as to come in close contact with the corrugated face 41a of the base part 41, and these corrugated faces 42a and 41a sandwich the shape-memory alloy 40. The driving part 42 has a rear face 42b that abuts on the rear end face 28b of the opening 28a of the support plate 28. The rear face 42b has recesses on the front side at both of the left and right ends, and one end of a blade spring 48 is disposed at each of the recesses. Each blade spring 48 has a shape like a crank, and the other end of the crank is fixed to the supporting piece 41b of the base part 41 with a screw 50. Each blade spring 48 holds the driving part 42 against the driving part 42 while always biasing the driving part 42 toward the base part 41 so as to press the corrugated face 42a in contact with the corrugated face 41a with the shape-memory alloy 40 sandwiched between them.

The shape-memory alloy 40 has a property that a deformed shape returns to the pre-deformed shape when heated at a predetermined temperature or higher, and connects to a not-illustrated driving electric source. The shape-memory alloy 40 is a thin plate like thread or belt, and is sandwiched between the corrugated faces 41a and 42a of the base part 41 and the driving part 42. The shape-memory alloy 40 has left and right ends sticking out from the corrugated faces 41a and 42a, and the left and right ends are fixed to the supporting pieces 41b of the base part 41 with screws 52. When no current from the driving electric source passes through the shape-memory alloy 40, the shape-memory alloy 40 contracts like a corrugated shape in the longitudinal direction and has a corrugated shape along the corrugated faces 41a and 42a between the corrugated faces 41a and 42a (see FIG. 2 and FIG. 9A). When current from the driving electric source passes through the shape-memory alloy 40, the temperature of the shape-memory alloy 40 reaches a predetermined temperature or higher due to the Joule heat, and so extends in the left-right direction to return to the original shape with reduced amplitude of waves. Such an extended shape of the shape-memory alloy pushes the corrugated faces 41a and 42a apart and moves the base part 41 and the driving part 42 apart from each other (see FIG. 9B).

The touch-operation unit 20 includes a blade spring 56 that is attached in front of the vibrator 31 via a bracket 54. The bracket 54 has a L-letter shape, and includes a vertical plate 54a on the rear side that extends in the up-down direction, and a horizontal plate 54b in front of the vertical plate 54a that extends forward. The vertical plate 54a has bosses 54c protruding from the rear face at both of the left and right ends. The top face of each boss 54c abuts on the corresponding supporting piece 41b and is fastened to the base part 41 with the screw 46. A center part of the rear face 54d of the vertical plate 54a abuts on the front face 41c of the base part 41. The blade spring 56 has substantially a V-letter shape in plan view, and bends forward from the front end of the mounting plate 58 that is fixed to the bottom face of the horizontal plate 54b. The blade spring 56 abuts on the front end face 28c of the opening 28a of the support plate 28 at their left and right tip ends of the V-letter that protrude forward. The front end face 28c of the present embodiment defines the rear face of a protruding plate 28d that bends downward from the front edge of the opening 28a.

In this way the base part 41 of the vibrator 31 is fixed to the touch-operation unit 30, and the rear face 42b of the driving part 42 of the vibrator 31, the driving part 42 being held movable toward and away from the base part 41, abuts on the rear end face 28b of the opening 28a of the support plate 28. The base part 41 of the vibrator 31 is fixed to the blade spring 56, and this blade spring 56 abuts on the front end face 28c of the opening 28a of the support plate 28.

As shown in FIG. 2 and FIG. 3, the support plate 28 functions as a bracket to mount the touch-operation device 20 to the main body chassis 12 while movably supporting the touch-operation device 20. The support plate 28 includes a thin plate made of metal, such as aluminum or stainless steel, and has openings and tabs at appropriate parts. As stated above, the support 28 has the opening 28a at a center on the rear side. This opening is to dispose the vibrator 31 and the blade spring 56. A rear end of the support plate 28 supports the push buttons 24 to 26. The support plate 28 may be integrally formed with the main body chassis 12.

The touch-operation device 20 is configured so that the touch-operation unit 30 is mounted movably in the front-rear direction on the mounting face 28e as the top face of the support plate 28, and the vibrator 31 and the blade spring 56 also are mounted movably in the front-rear direction relative to the opening 28a. The electronic apparatus 10 includes a connector 60 connecting the touch-operation unit 30 to the support plate 28 so that the touch-operation unit 30 is movable on the mounting face 28e, and a positioning part 62 to guide the movement of the touch-operation unit 30 in the front-rear direction on the mounting face 28e.

Figure 4A:
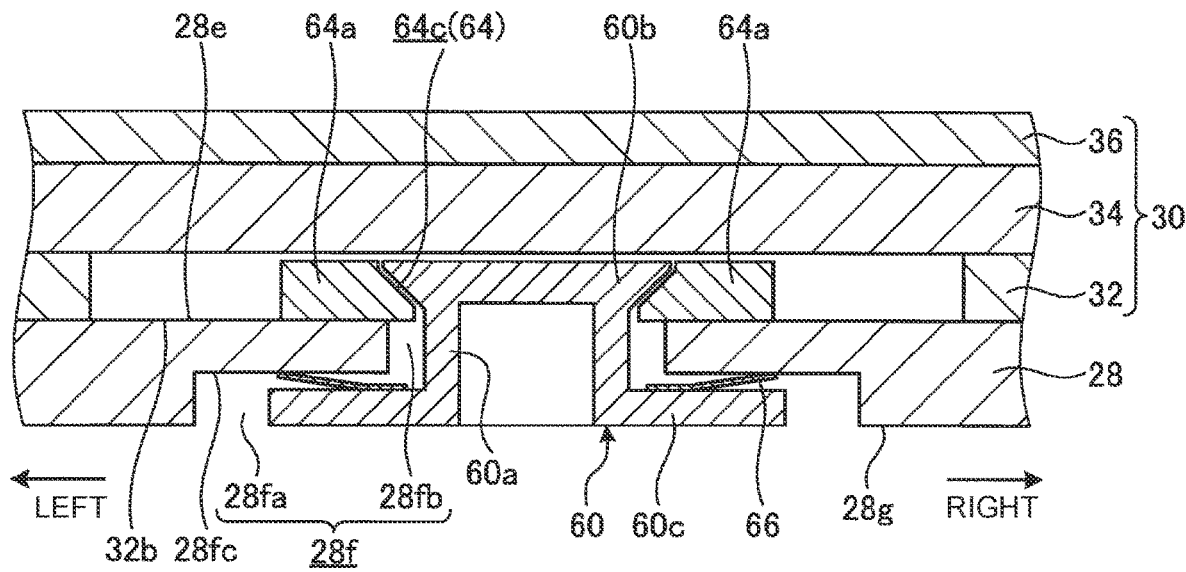
FIG. 4A is a cross-sectional view taken along the line IVA-IVA in FIG. 2.
Figure 4B:
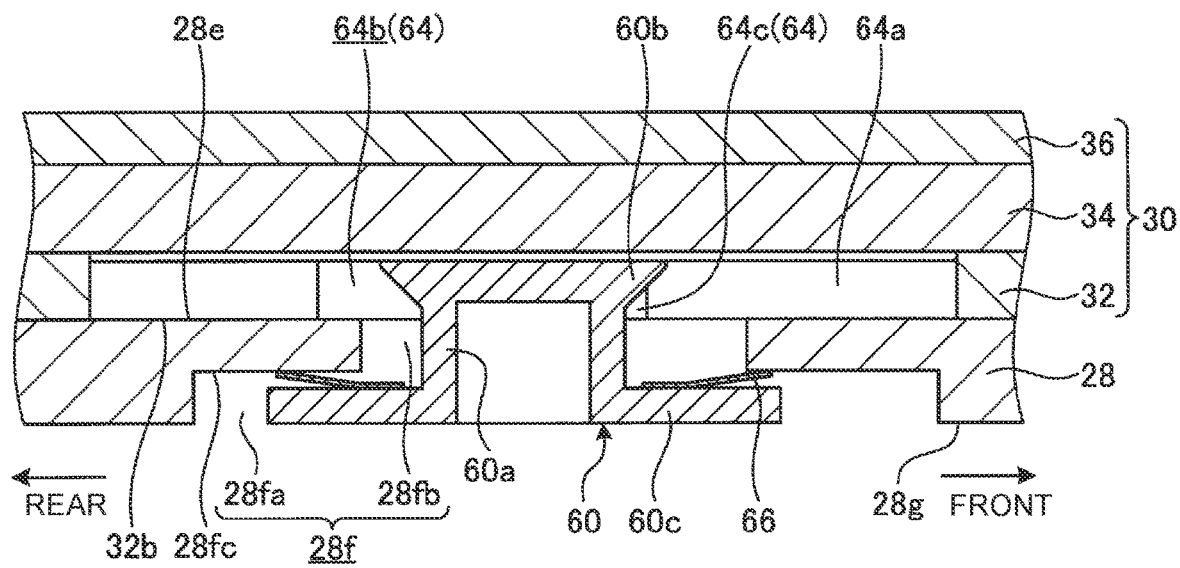
FIG. 4B is a cross-sectional view taken along the line IVB-IVB in FIG. 2.
Figure 4C:
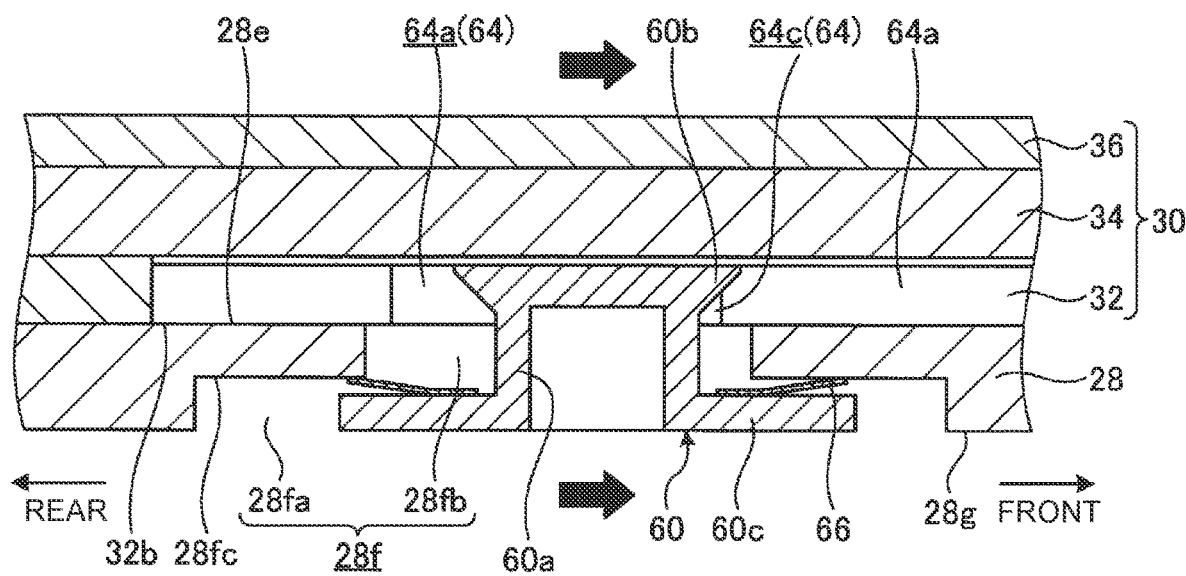
FIG. 4C is a cross-sectional view showing the touch-operation unit that moves forward from the position of FIG. 4B on the mounting face.
Figure 5:
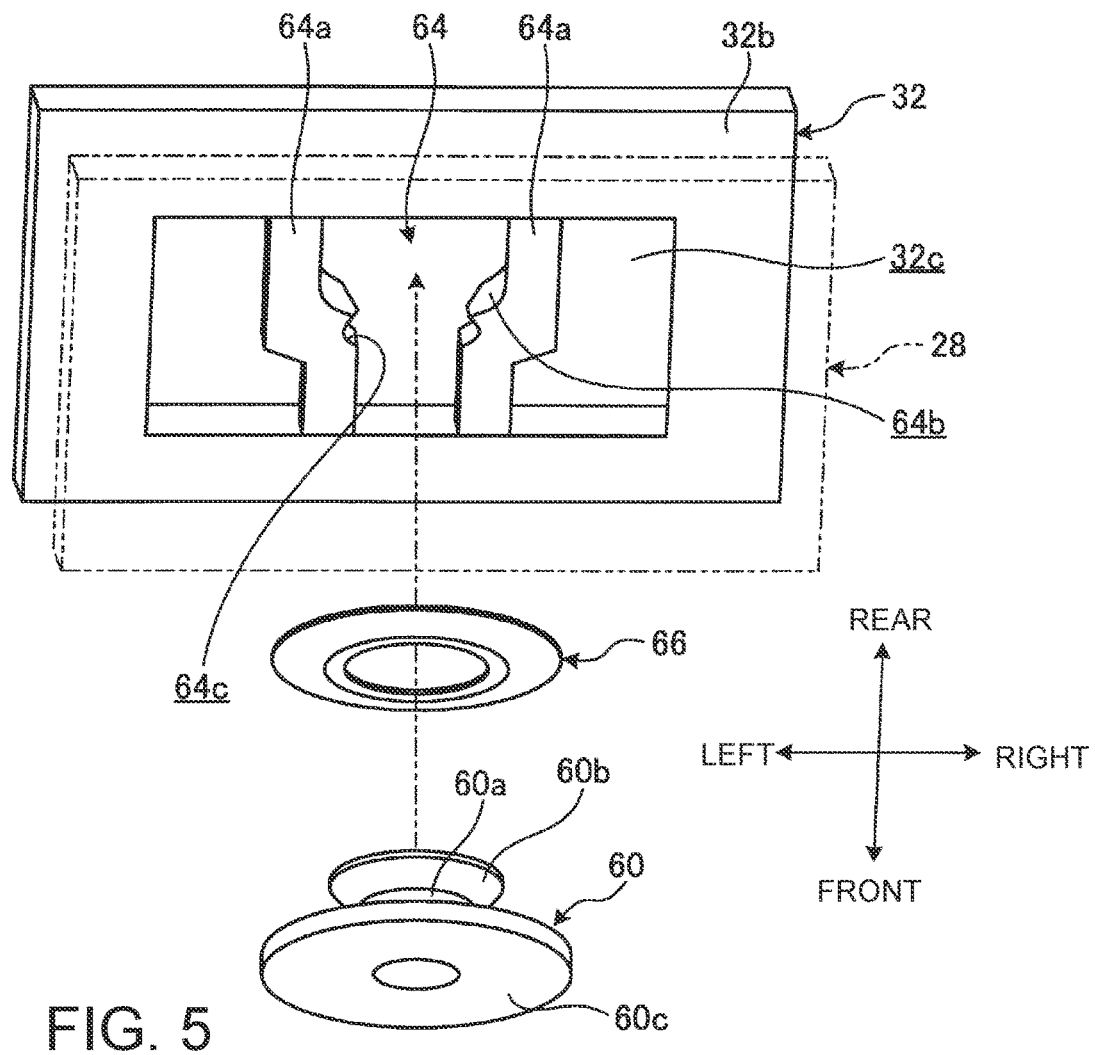
FIG. 5 is an exploded perspective view of the attachment structure of a connector.
Figure 6:
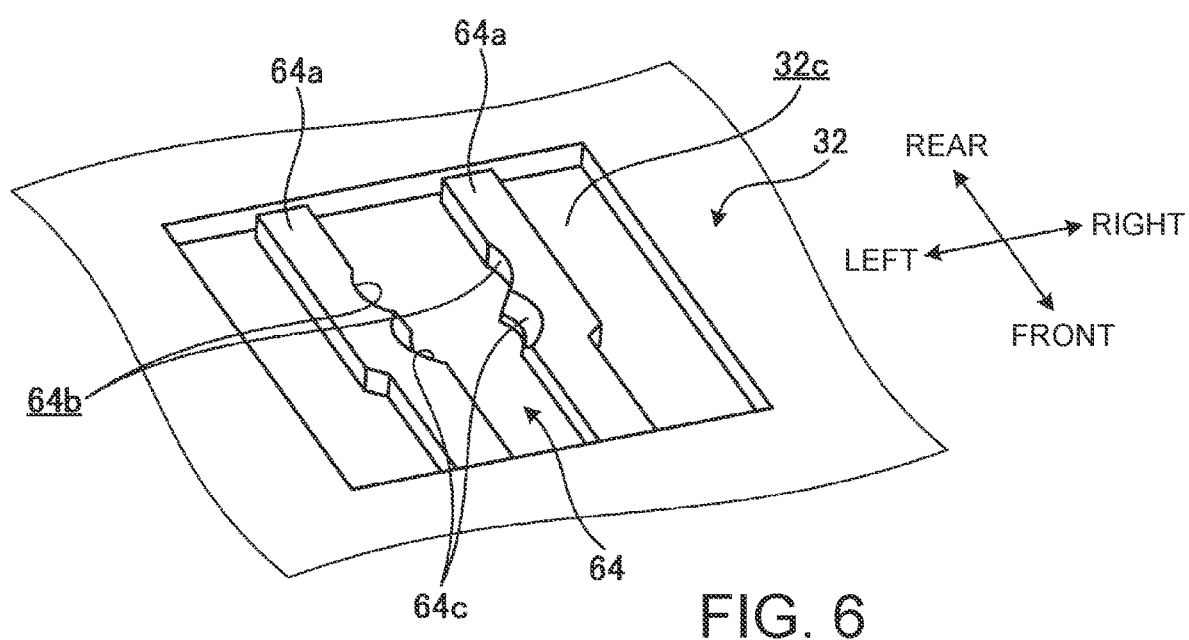
FIG. 6 is a perspective view of a snap-engaging part and the periphery that are formed in the base plate viewed from above.

FIG. 4A is a cross-sectional view taken along the line IVA-IVA in FIG. 2. FIG. 4B is a cross-sectional view taken along the line IVB-IVB in FIG. 2. FIG. 4C is a cross-sectional view showing the touch-operation unit 30 that moves forward from the position of FIG. 4B on the mounting face 28e. FIG. 5 is an exploded perspective view of the attachment structure of the connector 60. FIG. 6 is a perspective view of a snap-engaging part 64 and the periphery that are formed in the base plate 32 viewed from the above.

As shown in FIG. 2, the connectors 60 are disposed at a plurality of positions (e.g., eight positions). As shown in FIG. 4A, FIG. 4B and FIG. 5, each connector 60 is a hook-like clip that includes a cylindrical rod 60a, a fixing part 60b at one end of the rod 60a, and a retained part 60c at the other end of the rod 60a. The connectors 60 are made of metal, such as stainless steel, iron or carbon steel, or resin. Preferably the connectors 60 are made of an electrically conductive material. The same applies to connectors 70 and 74 described later.

The rod 60a extends in the up-down direction, and passes through a hole 28f of the support plate 28 from the bottom face 28g. The hole 28f of the present embodiment has a shoulder part between the bottom face 28g and the mounting face 28e of the support plate 28 so that the inner diameter of the hole 28f is smaller on the mounting-face 28e side. The hole 28f is a slot that is elongated in the front-rear direction. The hole 28f includes a first slot 28fa having a large diameter that is open toward the bottom face 28g, and a second slot 28fb that communicates with the first slot 28fa and having a small diameter that is open toward the mounting face 28e. The rod 60a passes through the first slot 28fa and the second slot 28fb so as to be movable in the front-rear direction.

The fixing part 60b is a flange-like disk at the upper end of the rod 60a, and has an outer circumferential face having a tapered shape so that the diameter gradually increases toward the upper end of the rod 60a. The fixing part 60b snap-engages with a snap-engaging part 64 of the base plate 32 of the touch-operation unit 30.

As shown in FIG. 5 and FIG. 6, the base plate 32 has a rectangular opening 32c. The snap-engaging part 64 includes a pair of left and right bridges 64a and 64a that extend between the front end face and the rear end face of the opening 32c. The snap-engaging part 64 has an insertion hole 64b and an engaging hole 64c at the left and right bridges 64a and in the space between these bridges 64a, 64a. The insertion hole 64b has an inner diameter, through which the fixing part 60b of the connector 60 passes through. The engaging hole 64c is located in front of the insertion hole 64b and has an overlapped part with the insertion hole 64b. The engaging hole 64c has an inner diameter, through which the rod 60a of the connector 60 is insertable and that is smaller than the inner diameter of the fixing part 60b.

Figure 7A:
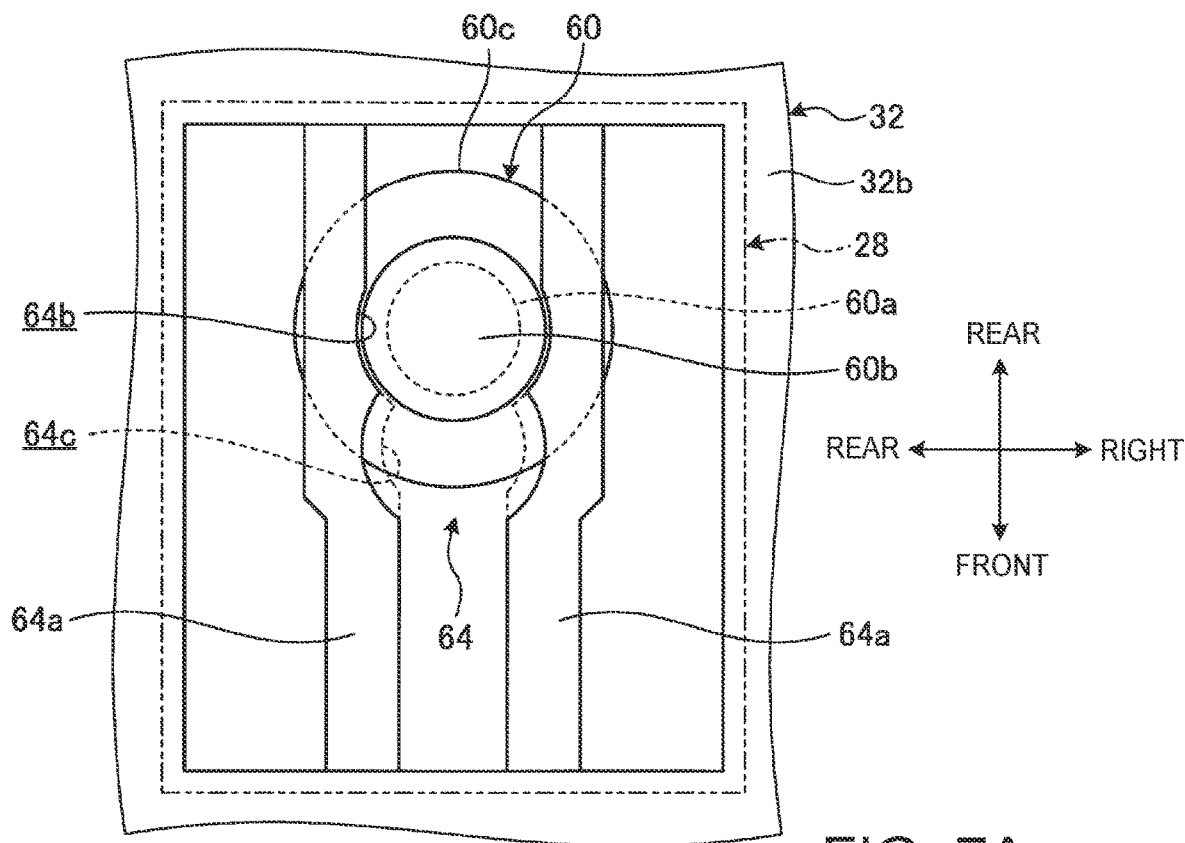
FIG. 7A is an enlarged plan view showing the major part of a fixing part of the connector passed through the insertion hole of the snap-engaging part.
Figure 7B:
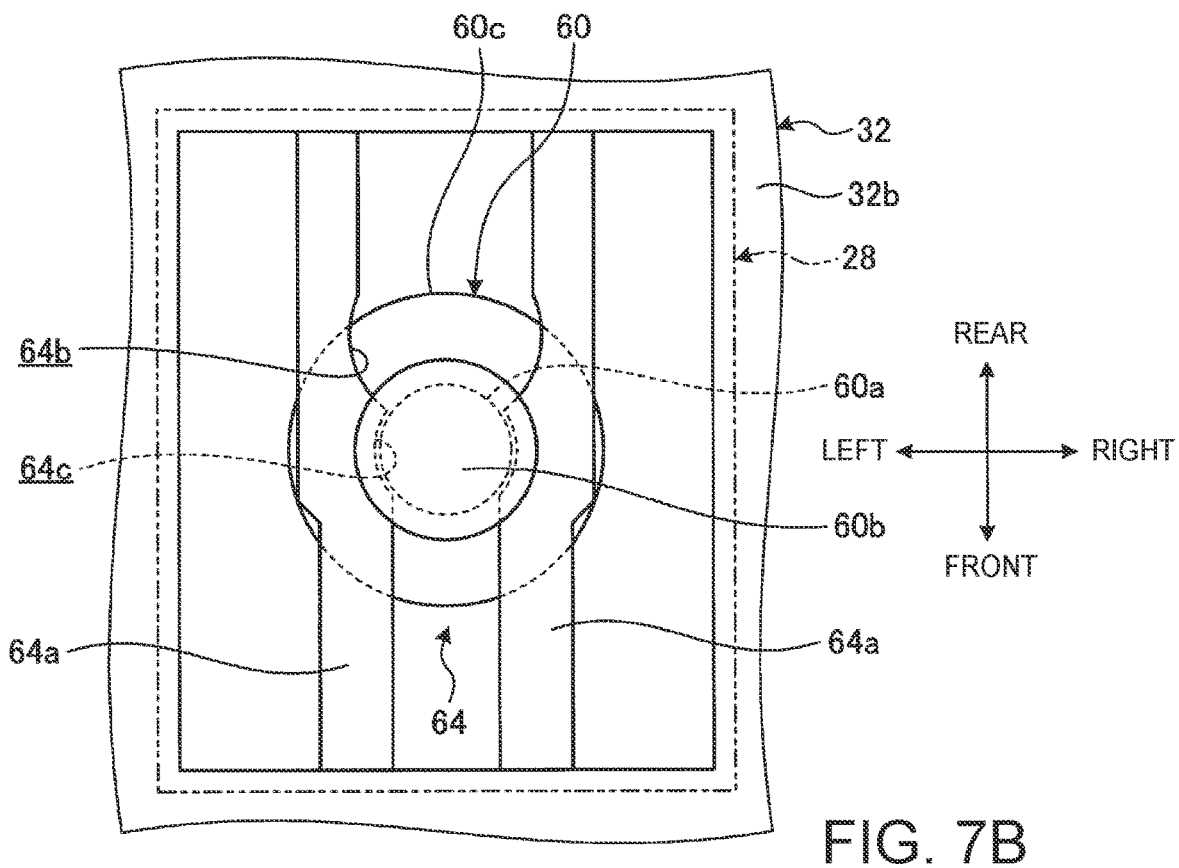
FIG. 7B is an enlarged plan view showing the major part of the fixing part that moves from the state of FIG. 7A so as to engage with the engaging hole of the snap-engaging part.

To engage the connector 60 with the snap-engaging part 64, the fixing part 60b of the connector 60 is inserted through the insertion hole 64b (see FIG. 7A). Next the connector 60 is moved forward so that the rod 60a pushes the left and right bridges 64a and 64a apart and then snap-engages with the engaging hole 64c and a top face of the engaging hole 64c retains the fixing part 60b (see FIG. 4A and FIG. 7B). As a result, the connector 60 is fixed immovably relative to the base plate 32. The fixing part 60b of the present embodiment has a tapered face on the outer circumferential face, and this tapered face abuts on the tapered face of the inner circumferential face of the engaging hole 64c, so that the fixing part 60b is disposed within the thickness of the bridge 64a. This means that the fixing part 60*b* does not protrude above from the base plate 32, and so does not interfere with the slimming of the touch-operation part 30.

The retained part 60*c* is at the bottom end of the rod 60*a*, and is a flange-like disk having a larger diameter than those of the insertion hole 64*b*, the engaging hole 64*c* and the fixing part 60*b*. The retained part 60*c* is retained at the bottom face 28*fc* of the first lot 28*fa* in the hole 28*f*, and is movable in the first slot 28*fa* in the front-rear direction (see FIG. 4C). The present embodiment includes a spring washer (elastic member) 66 between the retained part 60*c* and the opening edge (bottom face 28*fc*) of the first slot 28*fa*. The spring washer 66 externally fits to the rod 60*a* at a part between the retained part 60*c* and the bottom face of the first slot 28*fa*. The spring washer 66 always biases the retained part 60*c* in the direction away from the bottom face 28*fc* of the first slot 28*fa* (downward). This allows the connector 60 to always bias the base plate 32 (touch-operation part 30) so as to push the base plate 32 against the mounting face 28*e* via the fixing part 60*b*. The spring washer 66 is made of an electrically conductive material, such as stainless steel and steel.

Figure 8:
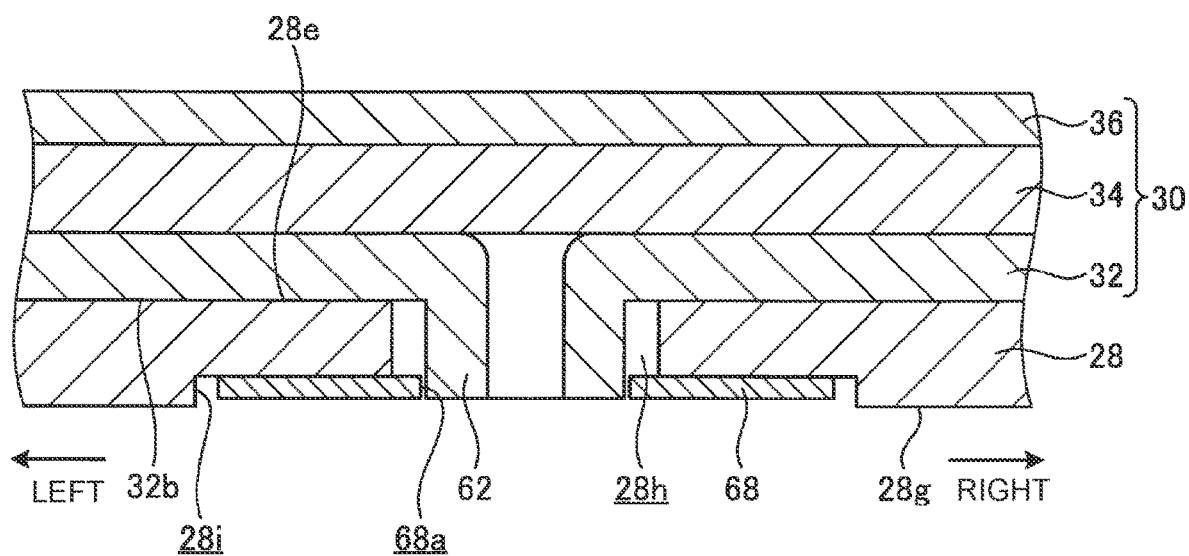
FIG. 8 is a cross-sectional view taken along the line VIII-VIII in FIG. 2.

FIG. 8 is a cross-sectional view taken along the line VIII-VIII in FIG. 2. As shown in FIG. 8, the positioning part 62 is a cylindrical part that is formed by machine processing of the base plate 32 so as to protrude downward from the bottom face 32*b*. The positioning parts 62 are disposed at a plurality of positions (e.g., two positions) (see FIG. 2). The support plate 28 has positioning holes 28*h* at the positions corresponding to the positioning parts 62 to insert the positioning parts 62. The positioning hole 28*h* is a slot that extends in the moving direction (front-rear direction) of the touch-operation unit 30 on the mounting face 28*e* of the support plate 28, and positions the positioning part 62 immovably in the left-right direction orthogonal to the moving direction. In the present embodiment, the connectors 60 and the holes 28*f* limit the movement of the touch-operation unit 30 in the left-right direction to some extent, and so the positioning part 62 may be omitted. FIG. 2 shows the example including these positioning parts 62 on the left and right as a pair. Preferably a plurality of positioning parts 62 is arranged in the front-rear direction at a center in the left-right direction of the bottom face 32*b* because the positioning parts 62 is for positioning in the left-right direction.

The bottom face 28*g* of the support plate 28 of the present embodiment has a shallow recess 28*i* that surrounds the positioning hole 28*h*. The recess 28*i* stores and fixes a positioning plate 68, and the positioning plate 68 has a positioning hole 68*a* that is narrower than the positioning hole 28*h* in the left-right direction and limits the movement of the positioning part 62 in the left-right direction more reliably (see FIG. 2 as well). The positioning hole 28*h* has a width in the left-right direction that is slightly larger than that of the positioning part 62 with consideration given into the manufacturing tolerances and assembling accuracy. The present embodiment includes the positioning hole 68*a* of the positioning plate 68 overlapped with the positioning hole 28*h* of the support plate 28, so as to increase the positioning accuracy of the positioning part 62 in the left-right direction. The positioning plate 68 may be omitted.

The following describes the operation of the electronic apparatus 10 as stated above when a user performs a touch-input operation with the touch-operation device 20.

Figure 9A:
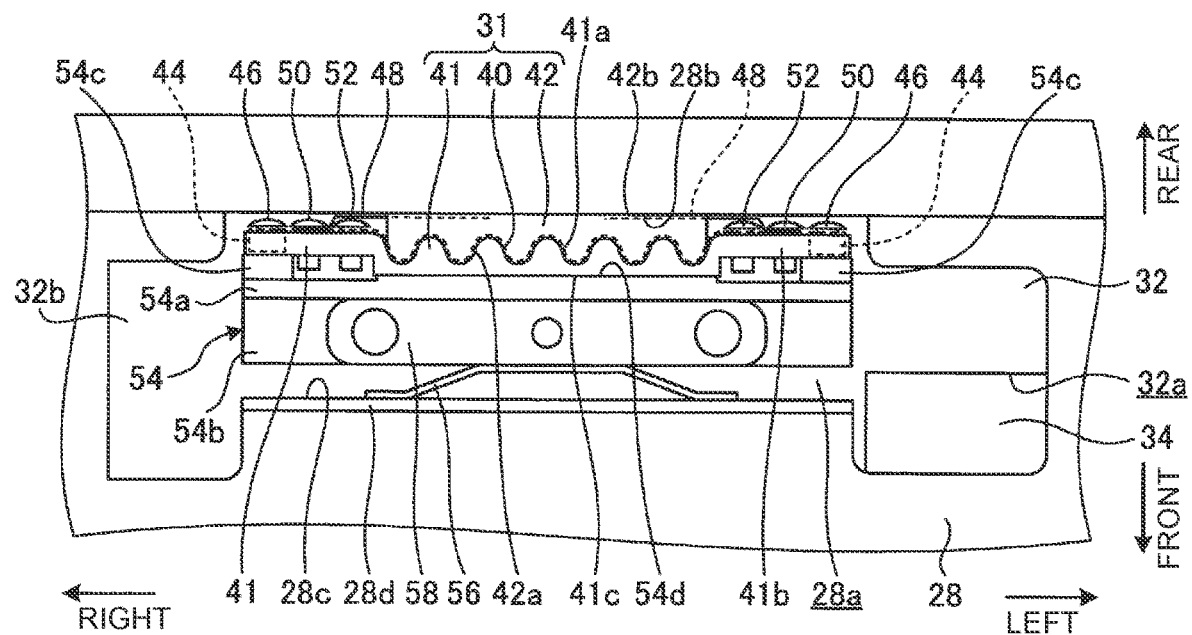
FIG. 9A is an enlarged bottom view showing the major part of the attachment structure of a vibrator.
Figure 9B:
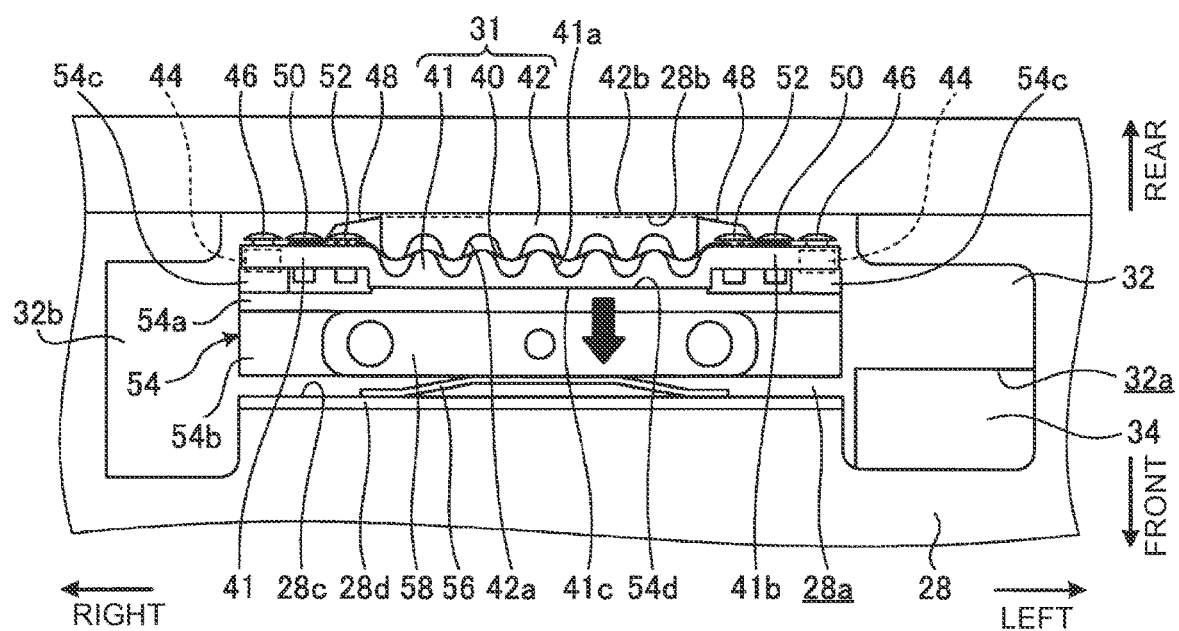
FIG. 9B is an enlarged bottom view showing the driven state of the vibrator shown in FIG. 9A.
Figure 10A:
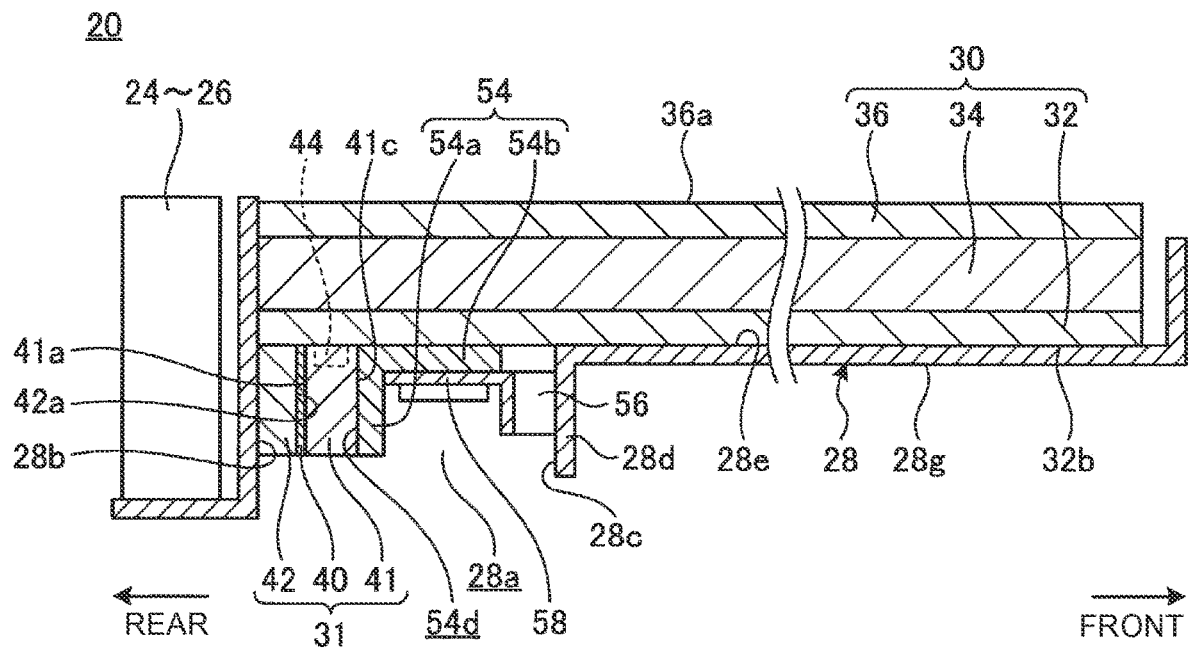
FIG. 10A is a cross-sectional view showing the attachment structure of a vibrator.
Figure 10B:
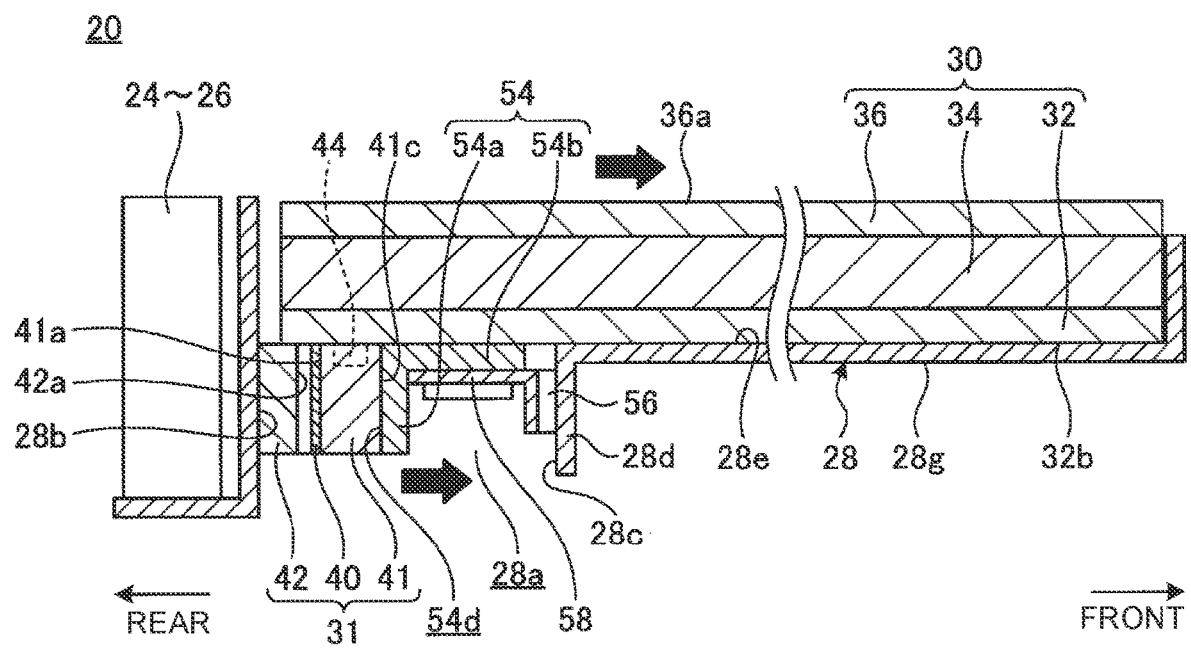
FIG. 10B is a cross-sectional view showing the driven state of the vibrator shown in FIG. 10A.

Before the touch-input operation to the input face 36*a* of the touch-operation device 20, the shape-memory alloy 40 is not powered by the electric supply. The shape-memory alloy 40 of the vibrator 31 in this state contracts like corrugation as shown in FIG. 2, FIG. 9A and FIG. 10A, and the corrugated face 41*a* of the base part 41 and the corrugated face 42*a* of the driving part 42 are at the initial position where the corrugated faces sandwiching the shape-memory alloy 40 are closest to each other. At this initial position, the base part 41 is at the rearmost position relative to the support plate 28 (main body chassis 12) due to the biasing force from the blade spring 56. The touch-operation unit 30 fixed to the base part 41 also is at the rearmost position on the mounting face 28*e* of the support plate 28 (see FIG. 3 and FIG. 10A).

When the user performs a clicking operation on the input face 36*a* in this state with a fingertip, for example, the board 34 detects this clicking operation and the shape-memory alloy 40 is powered. When the shape-memory alloy 40 reaches a predetermined temperature or higher, the shape-memory alloy 40 returns to the original shape so as to extend in the left-right direction, and such a shape-memory alloy 40 pushes the corrugated faces 41*a* and 42*a* apart and moves the base part 41 and the driving part 42 apart from each other (see FIG. 9B). In the present embodiment, the rear face 42*b* of the driving part 42 abuts on the rear end face 28*b* of the opening 28*a* of the support plate 28. The position of the driving part 42 in the front-rear direction therefore does not change, and the base part 41 moves relatively forward in the opening 28*a* against the biasing force from the blade spring 56. At this time, the shape-memory alloy 40 of the vibrator 31 is powered continuously at a predetermined frequency in accordance with the duration of the clicking operation and the pressure applied to the input face 36*a*, for example. As a result, the base part 41 vibrates in the opening 28*a* in the front-rear direction due to the vibrations generated in the vibrator 31 and the elastic force from the blade spring 56 and the blade spring 48.

The touch-operation unit 30 fixed to the base part 41 connects to the support plate 28 (main body chassis 12) via the connectors 60 and the positioning parts 62 so that the touch-operation unit 30 is movable in the front-rear direction and is immovable in the left-right direction and in the up-down direction. With this configuration, vibrations of the vibrator 31 in the front-rear direction vibrates the touch-operation unit 30 smoothly on the mounting face 28*e* in the front-rear direction, and this gives the user a desired sense of clicking.

The electronic apparatus 10 includes the connectors 60 connecting the touch-operation unit 30 to the support plate 28 so that the touch-operation unit 30 of the touch-operation device 20 is movable in the front-rear direction at least on the mounting face 28*e* of the support plate 28. Each connector 60 has the fixing part 60*b* fixed to the touch-operation unit 30 at one end and the retained part 60*c* retained so as to be movable in the front-rear direction relative to the support plate 28 at the other end.

In this way, electronic apparatus 10 includes a floating structure having the connectors 60 unlike the conventional electronic apparatus that has the floating structure fixing the touch-operation unit to the main body chassis with a rubber. The electronic apparatus 10 eliminates the necessity of having a gap corresponding to the thickness of a rubber between the touch-operation unit 30 (base plate 32) and the main body chassis 12 (support plate 28), and so the touch-operation device 20 and the main body chassis 12 including the touch-operation device are slim. In the case of the floating structure with a rubber, the rubber attenuates vibrations generated by the vibrator. On the other hand, the floating structure of the electronic apparatus 10 including the connectors 60 has a factor to attenuate vibrations at the vibrator 31 that is frictional resistance only between the bottom face 32b of the base plate 32 and the mounting face 28e of the support plate 28. Note that while conventionally used rubber has a resisting force of 100 gf or higher, the experimentally confirmed resisting force due to the frictional force of the electronic apparatus 10 was about 10 gf. This means that the floating structure of the present embodiment transmits vibrations generated by the vibrator 31 to the touch-operation unit 30 with very little attenuation, and so a user obtains a sufficient sense of clicking due to strong vibrations.

The connector 60 may be attached simply by fixing the fixing part 60b at one end to the touch-operation unit 30 and retaining the retained part 60c at the other end to the support plate 28. With this configuration, the connector 60 is easily attached and removed as compared with the conventional attachment structure of the touch-operation unit with rubber for fixing. The connector 60 can be prepared by machine processing and cold heading of metal, and has the advantages of having good dimensional accuracy easily.

The fixing part 60b of the connector 60 snap-engages with the snap-engaging part 64 of the base plate 32. That is, the fixing part 60b is fixed to the base plate 32 by inserting the fixing part 60b into the insertion hole 64b and simply by sliding the fixing part 60b forward for snap-engaging with the engaging hole 64c. With this configuration, the connector 60 can be easily attached and removed.

The fixing part 60b, which snap-engages with the engaging hole 64c, may have an outer diameter sufficiently larger than the inner diameter of the engaging hole 64c, and the fixing part 60b with such a larger outer diameter still engages with the engaging hole 64c easily. In this way the fixing part 60b has a sufficiently large outer diameter. This can prevent the connector 60 from coming out from the engaging hole 64c in the axial direction while making the fixing part 60b and the engaging hole 64c as thin as possible. In other words, if the fixing part 60b of the connector 60 axially fits to the base plate 32 having the engaging hole 64c only and without the insertion hole 64b, the fixing part 60b has to press the insertion hole 64b strongly to enlarge the insertion hole 64b, and so the attachment load will increase. For easy fitting of the fixing part 60b to such an insertion hole 64b, the fixing part 60b or the insertion hole 64b has to be chamfered at the opposing face during insertion. This leads to the difficulty of making the fixing part or the insertion hole thinner. In some embodiments, the fixing part 60b does not snap-engage with the base plate 32 and may axially fit to the engaging hole 64c only in accordance with the specifications of the electronic apparatus 10.

The electronic apparatus 10 includes the spring washer 66 between the retained part 60c of the connector 60 and the opening edge (bottom face 28fc) of the hole 28f the support plate 28, and the spring washer 66 is an elastic member that biases the touch-operation unit 30 so as to push the touch-operation unit 30 against the mounting face 28e of the support plate 28. With this configuration, the touch-operation unit 30 always receives a biasing force from the spring washer 66 and via the connector 60 so that the touch-operation unit 30 moves down in the main body chassis 12. This enables easy adjustment in height between the input face 36a as the top face of the touch-operation unit 30 and the top face 12a of the main body chassis 12 disposed around the touch-operation unit 30 (so that these faces are flush with each other). As shown in FIG. 3, this can easily keep the input face 36a at a lower position than the top face 12a of the main body chassis 12 or to be flush with the top face 12a, and so the appearance of the electronic apparatus 10 at the touch-operation unit 30 and the periphery improves.

The connector 60 and the spring washer 66 of the electronic apparatus 10 are made of an electrically conductive material. This means that the metal base plate 32 and the main body chassis 12 (support plate 28) of the electronic apparatus 10 are electrically connected via the connector 60 and the spring washer 66 that are made of an electrically conductive material. The connector 60 and the spring washer 66 therefore function as the ground that is countermeasure against electrostatic discharge (ESD) and electromagnetic interference (EMI). That is, the connector 60 to connect the touch-operation unit 30 and the main body chassis 12 doubles as the ground, and so the number of components reduces. When such countermeasure against ESD and EMI is not required for the connector 60 and the spring washer 66, the connector 60 may be made of resin and the spring washer 66 may be another elastic member, such as a rubber washer.

Figure 11:
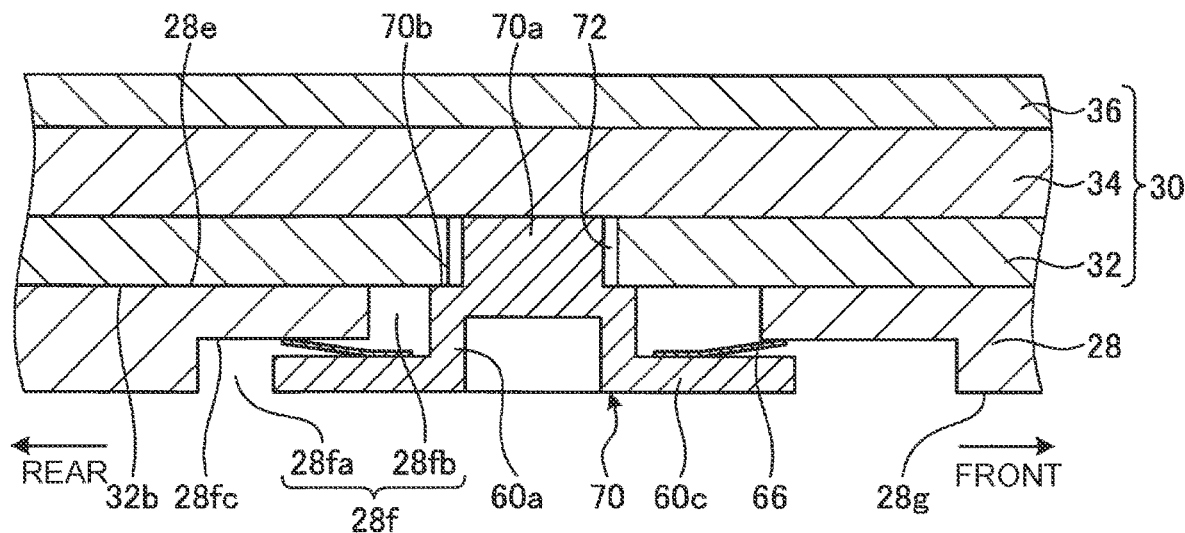
FIG. 11 is a cross-sectional view showing a connector according to a first modified example to connect the touch-operation unit and the support.

FIG. 11 is a cross-sectional view of a connector 70 according to a first modified example to connect the touch-operation unit 30 and the support plate 28. As shown in FIG. 11, the connector 70 includes a fixing part 70a instead of the fixing part 60b (see FIG. 4A) that snap-engages with the snap-engaging part 64 for fixing to the base plate 32. This fixing part 70a is screwed to the base plate 32. The connector 70 is a shoulder screw having the fixing part 70a with an external thread at the upper end of the rod 60a above a shoulder 70b. The outer diameter of this screw is smaller at a part above the shoulder 70b. The base plate 32 has a hole 72 with an internal thread that th readably engages with the fixing part 70a. The fixing part 70a of the connector 70 passes through the hole 28f for threadably engagement with the internal-thread hole 72 until the shoulder 70b abuts on the bottom face 32b of the base plate 32. Such a connector 70 also enables connection of the touch-operation unit 30 to the support plate 28 while making the touch-operation unit 30 movable in the front-rear direction on the mounting face 28e.

Figure 12:
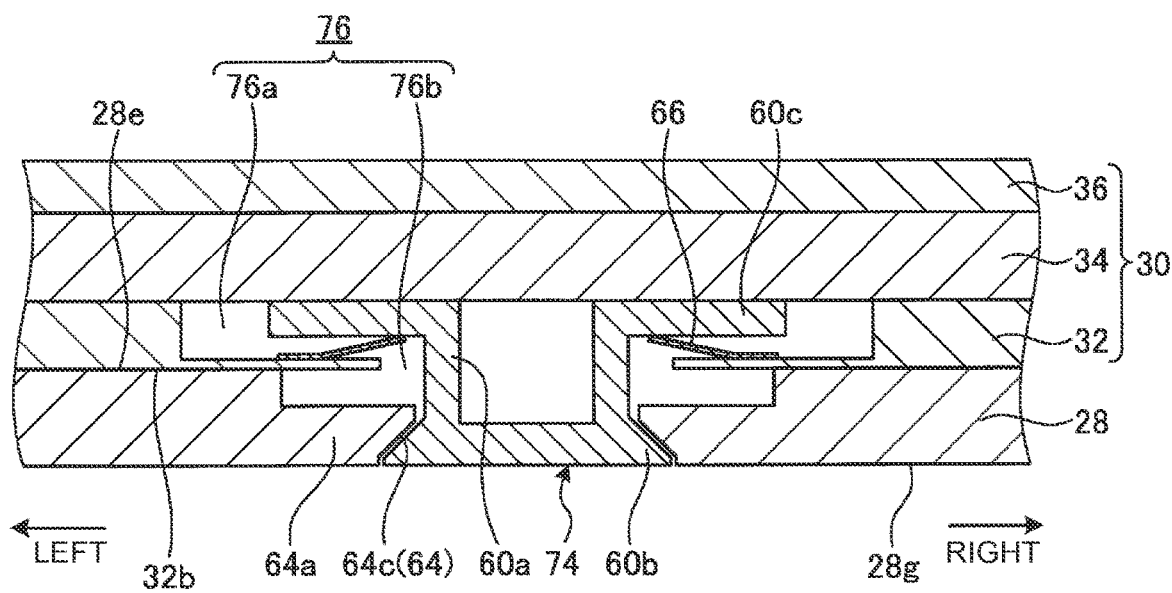
FIG. 12 is a cross-sectional view showing a connector according to a second modified example to connect the touch-operation unit and the support.

FIG. 12 is a cross-sectional view of a connector 74 according to a second modified example to connect the touch-operation unit 30 and the support plate 28. The connector 60(70) as stated above has the fixing part 60b (70a) to be fixed to the base plate 32 of the touch-operation unit 30, and the retained part 60c retained to be movable in the front-rear direction relative to the support plate 28 in the main body chassis 12. The connector 74 in FIG. 12 is the attachment structure having the vertically flipped structure of the connector 60. Specifically the connector 74 has a fixing part 60b to be fixed to the support plate 28 of the main body chassis 12, and a retained part 60c retained to be movable in the front-rear direction relative to the base plate 32 of the touch-operation unit 30. In such a configuration, the support plate 28 includes a snap-engaging part 64 that snap-engages with the fixing part 60b for fixing, and the base plate 32 has a hole 76 to retain the retained part 60c to be movable in the front-rear direction. The hole 76 has a substantially similar structure to that of the hole 28f in FIG. 4A. Specifically the hole 76 includes a first slot 76a having a large diameter that is open toward the top face of the base plate 32, and a second slot 76b that communicates with the first slot 76a and having a small diameter that is open toward the bottom face 32b. Such a connector 74 also enables connection of the touch-operation unit 30 to the support plate 28 while making the touch-operation unit 30 movable in the front-rear direction on the mounting face 28e. The connector 74 may include a fixing part 70a with an external thread similarly to FIG. 11, instead of the fixing part 60b.

Figure 13:
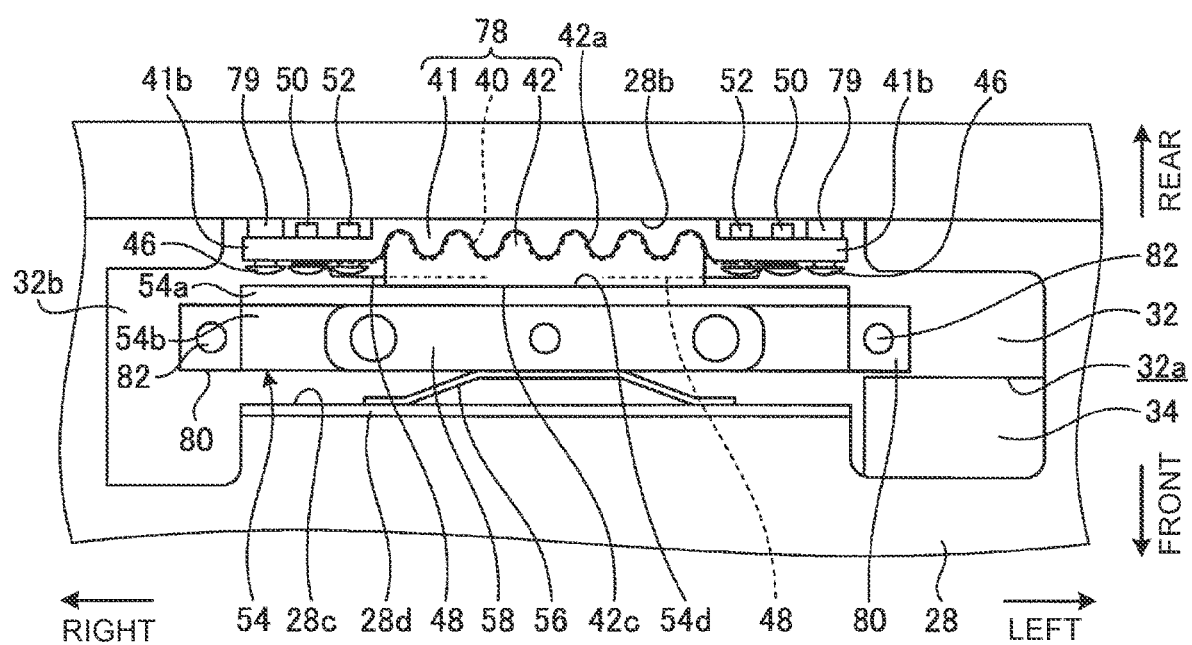
FIG. 13 is an enlarged bottom view showing the attachment structure of a vibrator according to a modified example.

FIG. 13 is an enlarged bottom view showing the major part of the attachment structure of a vibrator 78 according to a modified example.

As shown in FIG. 2 and FIG. 9A, the vibrator 31 is attached so that the base part 41 is fixed to the base plate 32 of the touch-operation unit 30, and the rear face 42b of the driving part 42 abuts on the rear end face 28b of the opening 28a of the support plate 28. The vibrator 78 in FIG. 13 has a flipped structure of the vibrator 31 in FIG. 10A in the front-rear direction so that the base part 41 is fixed to the rear end face 28b of the support plate 28. This vibrator 78 includes a cylindrical sleeve 79 between each of the supporting piece 41b at both of the left and right ends of the base part 41 and the rear end face 28b of the support plate 28, and fixes the base part 41 and the support plate 28 with screws 46 via the sleeves 79. The driving part 42 of the vibrator 78 has a front face 42c that abuts on the rear face 54d of the bracket 54. The bracket 54 has attachments 80 protruding from both of the left and right ends of the horizontal plate 54b, for example, and these attachments 80 are fixed to the bottom face 32b of the base plate 32 with screws 82. With this configuration, when the powered shape-memory alloy 40 of such a vibrator 78 returns to the original position, the driving part 42 moves forward against the biasing force from the blade spring 56, and vibrates in the opening 28a in the front-rear direction. At this time, the bracket 54 is fixed to the base plate 32, and so the touch-operation unit 30 also vibrates with the vibrator 78 in the front-rear direction.

As has been described, the present invention provides a slim electronic apparatus that can gives a user a sufficient sense of clicking in response to a user's touch input operation.

The present invention is not limited to the above-described embodiments, and can be modified freely without deviating from the scope of the present invention.

The above describes a touchpad as an example of the touch-operation device 20. The touch-operation device 20 may be used for other devices to receive a user's touch-input operation, such as push buttons 24 to 26, the keyboard unit 18 and the touch panel of the display 14a.

The above describes an example of the vibrator 31 (78) that generates vibrations in the front-rear direction to vibrate the touch-operation unit 30 in the front-rear direction. In another example, the vibrator 31 (78) may vibrate the touch-operation device 20 in the left-right direction or in the front-rear and the left-right directions. In such a case, the shape of the holes 28f may be changed, and the shape of the positioning parts 62 may be changed or the positioning parts may be omitted. Instead of the actuator having a shape-memory alloy 40, the vibrator 31 (78) may include other devices, such as an actuator including a piezoelectric element, an eccentric motor, and a liner vibrator.

While the invention has been particularly shown and described with reference to a preferred embodiment, it will be understood by those skilled in the art that various changes in form and detail may be made therein without departing from the spirit and scope of the invention.

What is claimed is:

1. An electronic apparatus, comprising:
    a chassis;
    a touch-operation unit includes
        a pad plate for receiving a touch-input operation from a user; and
        a base plate;
    a support plate, within said chassis, having a mounting face to movably mount said touch-operation unit;
    a vibrator, coupled to said touch-operation unit and said support plate, generates vibrations to said touch-operation unit; and
    a connector having a fixing part and a retained part, wherein said fixing part is fixed to one of said touch-operation unit and said support plate, and said retained part is movable relative to the other of said touch-operation unit and said support plate at least along one direction parallel to said mounting face of said support plate.

2. The electronic apparatus of claim 1, wherein said connector includes a cylindrical rod having a first end at which said fixing part is located, and a second end at which said retained part is located.

3. The electronic apparatus of claim 2, wherein the other of said touch-operation unit and said support plate includes a hole through which said cylindrical rod is inserted movably at least in said one direction, and said retained part is retained in an opening edge of said hole.

4. The electronic apparatus of claim 2, further comprising an elastic member disposed between said retained part and said opening edge of said hole, wherein said elastic member biases said touch-operation unit in order to push said touch-operation unit against said mounting face of said support plate.

5. The electronic apparatus of claim 4, wherein said connector and said elastic member are made of an electrical conductive material.

6. The electronic apparatus of claim 1, wherein one of said touch-operation unit and said support plate includes a snap-engaging part that snap-engages with said fixing part of said connector.

7. The electronic apparatus of claim 1, wherein said vibrator moves said touch-operation unit relative to said support plate along said one direction.

8. The electronic apparatus of claim 7, further comprising a positioning part that immovably positions said touch-operation unit and said support plate in a direction parallel to said mounting face of said support plate and orthogonal to said one direction.

9. The electronic apparatus of claim 1, wherein said vibrator includes a base part, a shape-memory alloy, and a driving part.

10. The electronic apparatus of claim 9, wherein a contraction of said shape-memory alloy moves said touch-operation unit to generate an acceleration to give said user a sense of clicking.

11. The electronic apparatus of claim 9, wherein said base part includes a corrugated surface.

12. The electronic apparatus of claim 11, wherein said driving part includes a corrugated surface.

13. The electronic apparatus of claim 12, wherein said shape-memory alloy is a corrugated plate that conforms with said corrugated surface of said base part and said corrugated surface of said driving part.

14. The electronic apparatus of claim 1, wherein said fixing part and said retained part are flange-like disks having different diameters.

15. The electronic apparatus of claim 1, wherein said touch-operation unit further includes a board for detecting said touch-input operation.

16. The electronic apparatus of claim 15, wherein said board is a sensor for detecting said touch-input operation.

17. The electronic apparatus of claim 1, further comprising a plurality of push buttons supported by said support plate.

\* \* \* \* \*